United States Patent [19]

Yasuda et al.

[11] 4,186,697

[45] Feb. 5, 1980

[54] EXHAUST GAS PURIFICATION PROMOTING DEVICE

[75] Inventors: Yushiro Yasuda; Hironori Bessho, both of Susono, Japan

[73] Assignee: Toyota Jidosha Kogyo Kabushiki Kaisha, Toyota, Japan

[21] Appl. No.: 837,098

[22] Filed: Sep. 28, 1977

[30] Foreign Application Priority Data

Jun. 20, 1977 [JP] Japan .................................. 52-72196

[51] Int. Cl.[2] ........................ B60K 41/18; F02N 17/00

[52] U.S. Cl. ............................ 123/117 A; 123/179 G; 123/179 BG; 123/180 T; 74/860

[58] Field of Search ........ 123/179 G, 179 B, 179 BG, 123/179 L, 180 T, 97 R, 117 A, 103 R, 102, 119 F; 74/856–860

[56] References Cited

U.S. PATENT DOCUMENTS

| | | | |
|---|---|---|---|
| 3,291,462 | 12/1966 | Mennesson | 123/180 T |
| 3,805,642 | 4/1974 | Danek et al. | 74/860 |
| 3,809,034 | 5/1974 | Durichen | 123/102 |
| 3,918,257 | 11/1975 | Hirose et al. | 74/860 |
| 3,948,240 | 4/1976 | Hirosawa et al. | 123/179 G |
| 3,964,457 | 6/1976 | Coscia | 123/179 L |
| 4,008,697 | 2/1977 | Konno | 74/860 |
| 4,026,168 | 5/1977 | Kobayashi | 74/860 |
| 4,034,626 | 7/1977 | Udagawa et al. | 74/857 |
| 4,048,966 | 9/1977 | Harada et al. | 74/860 |

*Primary Examiner*—Ira S. Lazarus

*Attorney, Agent, or Firm*—Stevens, Davis, Miller & Mosher

[57] ABSTRACT

Disclosed is a device for promoting the purification of exhaust gas in an internal combustion engine at the time of warm-up. The opening degree of the throttle valve of the carburetor is temporarily maintained open at about 20 degrees immediately after the engine is started. After this, the throttle valve is closed stepwise to its idling position as the temperature of the engine is increased. When the gear shift of the transmission is shifted from neutral to, for example, low gear, for driving a vehicle in the case wherein the opening degree of the throttle valve is being held open at about 20 degrees, the throttle valve is automatically closed to an opening degree which is smaller than 20 degrees.

20 Claims, 13 Drawing Figures

EXHAUST GAS PURIFICATION PROMOTING DEVICE

DESCRIPTION OF THE INVENTION

The present invention relates to an apparatus for promoting purification of exhaust gas during the warm-up operation of an internal combustion engine.

In order to rotate an engine smoothly during the warm-up operation, it is necessary to feed an excessively rich air-fuel mixture to a cylinder of the engine, and for this purpose, a choke valve mechanism is ordinarily disposed in an internal combustion engine. An internal combustion engine provided with an automatic choke valve mechanism, wherein the choke valve is automatically opened as the temperature rises, comprises a fast idle cam mechanism arranged so that at the start of the engine a throttle valve of a carburetor is temporarily maintained open at a shift opening degree co-operatively with the choke valve, as the choke valve is opened, the degree of opening of the throttle valve is reduced stepwise, and when the choke valve is completely opened, the throttle valve is returned to the idle position. At present, most internal combustion engines comprise in the exhaust system an exhaust gas purifying apparatus, such as a catalytic converter or thermal reactor, for reducing the contents of poisonous components in exhaust gases. As is well-known in the art, in such catalytic converters, no satisfactory purifying effect can be obtained unless the temperature of the catalyzer is elevated to a certain level. Further, there is a defect that if the temperature of the catalyzer is excessively elevated, the catalyzer degrades. Also in thermal reactors, oxidation of unburnt HC and CO cannot be effectively promoted unless the temperature is sufficiently high. In an internal combustion engine equipped with both an exhaust gas purifying apparatus and the above-mentioned fast idle cam mechanism, since an excessively rich air-fuel mixture is fed to the engine cylinder during the warm-up operation, large quantities of unburnt components are discharged in the exhaust system of the engine. Further, since the temperature of the catalyzer or thermal reactor is low before completion of the warm-up operation, large quantities of such discharged unburnt components cannot be purified by the exhaust gas purifying apparatus and, therefore, large quantities of poisonous components are discharged into the atmosphere.

As a means for solving this problem, there has been proposed a throttle valve maintaining mechanism arranged so that, after the start of the engine, the degree of opening of the throttle valve is temporarily maintained at a level higher than that set by the above-mentioned fast idle cam mechanism to enhance the number of rotations of the engine during the warm-up operation. As a result the temperature of the exhaust gas is elevated to promptly heat the catalyzer or thermal reactor and enhance the efficiency of purification of the exhaust gas. In an internal combustion engine provided with this throttle valve maintaining mechanism, however, in the case where a vehicle is driven before completion of the warm-up in the state where the throttle valve is kept opened by the throttle valve maintaining mechanism and the number of revolutions of the engine is maintained at a relatively high level, since the engine is not provided with a mechanism for automatically releasing the valve-opening action of the throttle valve maintaining mechanism, even if the accelerator pedal is set free, because of the high number of revolutions of the engine the speed of the vehicle is not lowered and the operation is dangerous.

When, after the start of the engine, the degree of opening of the throttle valve is temporarily maintained at a level higher than that set by the conventional fast idle cam mechanism as pointed out hereinbefore, the catalyzer or thermal reactor is promptly heated. However, if this state is held over a long period of time, thermal degradation of the catalyzer or thermal reactor takes place. This is another problem to be solved.

A primary object of the present invention is to provide an apparatus for promoting purification of exhaust gas during the warm-up operation, which is arranged so that after the start of the engine the degree of opening of a throttle valve is temporarily maintained at a level higher than that set by the conventional fast idle mechanism, and in the case where a vehicle is driven before completion of warm-up while the throttle valve is kept open and the predetermined opening degree is maintained, the degree of opening of the throttle valve is automatically reduced to a lower degree of opening.

Another object of the present invention is to provide a purification-promoting apparatus in which with elevation of the engine temperature the throttle valve is closed stepwise towards the idling position and a smooth idling operation is thus ensured to prevent thermal degradation of the catalyzer or thermal reactor.

Still another object of the present invention is to provide a purification-promoting apparatus in which the ignition timing is retarded only during the warm-up operation during fast idling to elevate the temperature of the exhaust gas, whereby heating of the catalyzer or thermal reactor is promoted and good drivability is maintained during the warm-up operation.

According to the present invention, there is provided an exhaust gas purification promoting device of an internal combustion engine having a carburetor with a throttle valve in its intake passage, an exhaust gas purifier in its exhaust system and a transmission with a shift gear, said device comprising: means for temporarily maintaining the throttle valve at a predetermined first opening degree when the temperature of the engine is lower than a predetermined first level; means for detecting the gear position of the gear shift to provide a signal indicating that the gear shift is shifted from neutral; and means for actuating said maintaining means to release the holding operation of the throttle valve and return the throttle valve to a second opening degree, which is smaller than said first opening degree, in response to said signal when the gear shift is shifted from neutral.

The present invention may be more fully understood from the description set forth below of preferred embodiments of the invention, together with the accompanying drawings.

DESCRIPTION OF PREFERRED EMBODIMENTS

Figures 1, 2:
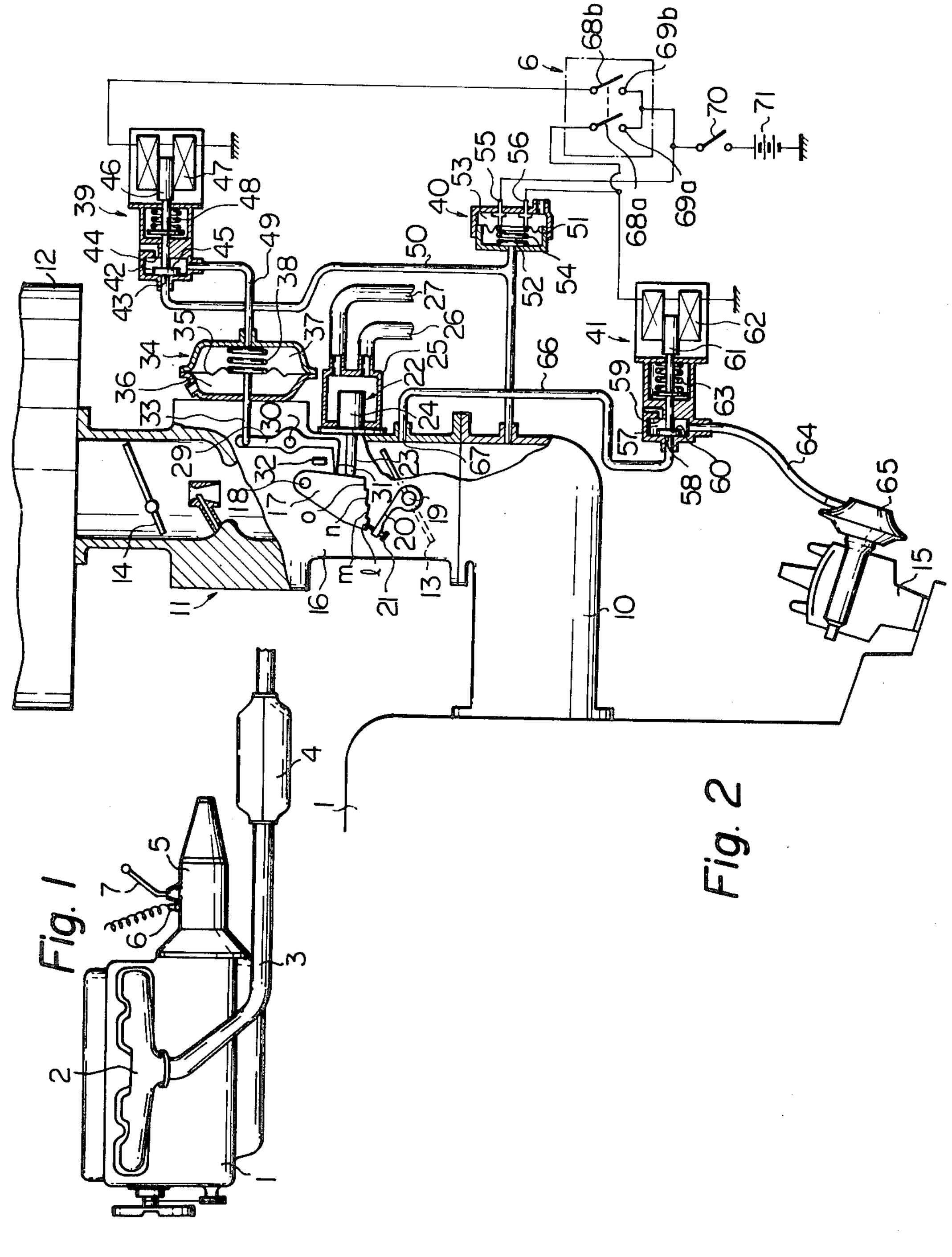
FIG. 1 is a general view of an internal combustion engine.
FIG. 2 is a schematic view of an embodiment of an exhaust gas purification device according to the present invention.
Figure 3A:
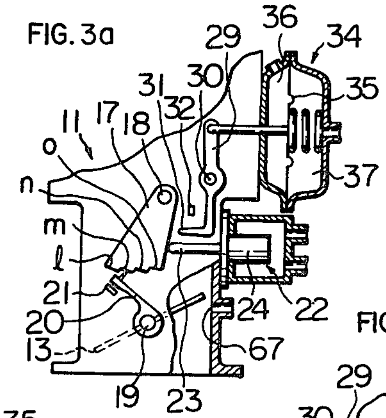
FIG. 3 is a schematic view showing various operating conditions of the purification device shown in FIG. 2.
Figure 3B:
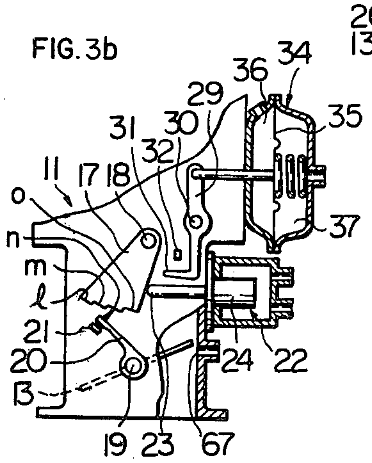
Figure 3C:
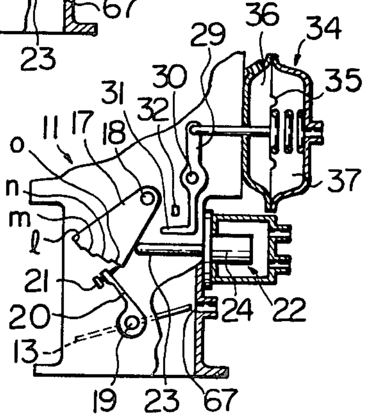
Figure 3D:
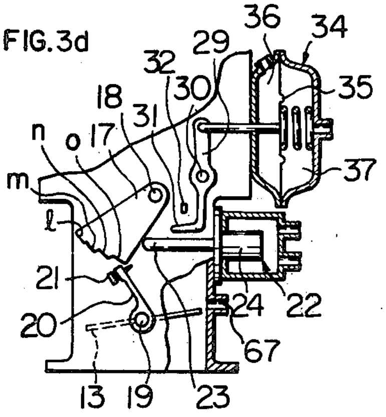
Figure 3E:
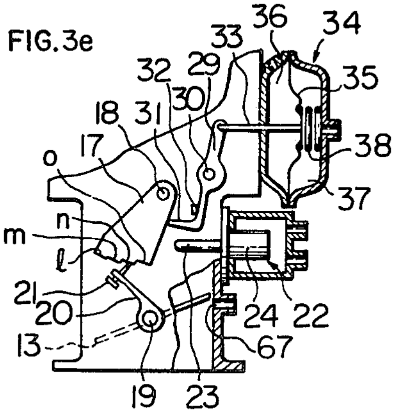

Referring to FIG. 1, reference numerals 1, 2, 3, 4 and 5 designate an engine body, an exhaust manifold, an exhaust pipe, a catalytic converter and a transmission, respectively. Reference numeral 6 designates a neutral position-detecting switch which is operated by a shift lever 7, so that when the gear shift of the transmission 5 is in the neutral position, the switch 6 is turned off and when the gear shift is in the variable speed positions (low gear position, second gear position and high gear position), the switch 6 is turned on. Since this neutral position-detecting switch is known, the explanation thereof is omitted. In the arrangement shown in FIG. 1, a thermal reactor may replace the exhaust manifold 2.

FIG. 2 is an enlarged view showing the intake system of the internal combustion engine illustrated in FIG. 1. Referring to FIG. 2, reference numerals 10, 11, 12, 13, 14 and 15 designate an intake manifold, a carbureter, an air cleaner, a throttle valve, a choke valve and a distributor driven by the engine, respectively. As shown in FIG. 2, a stepped circumferential cam 17, having four cam faces l, m, n and o, is mounted on a carbureter housing 16 through a pivot 18, and this stepped circumferential cam 17 is always urged counterclockwise by a spring (not shown). In this embodiment the cam 17 is not operated by the choke valve 14. An arm 20 is fixed to a throttle shaft 19 of the throttle valve 13, and an adjustment screw 21 capable of abutting against the cam faces l, m, n and o of the stepped circumferential cam 17 is fixed to the top end of the arm 20. The throttle valve 13 is always urged clockwise by a spring (not shown). A wax valve 22 is attached to the carbureter housing 16, and an operation rod 23 of this wax valve 22 is arranged so that it can be engaged with the side edge of the stepped circumferential cam 17. A detecting portion 24 of the wax valve 22 is located in a hollow vessel 25 and engine-cooling water is introduced into the hollow vessel 25 through a conduit 26. Cooling water introduced into the hollow vessel 25 flows around the detecting portion 24 and is then returned to a water jacket in the engine body 1 through a conduit 27. As is known in the art, the wax valve 22 is arranged so that as the temperature of cooling water introduced into the hollow vessel 25 is elevated, the operation rod 23 of the wax valve 22 is gradually projected.

An operation lever 29 is pivoted on the carbureter housing 16 through a pivot pin 30 and is arranged so that top end of a side projection 31 formed on the lower end portion of the operation lever 29 can abut against the side edge of the stepped circumferential cam 17. A stopper 32 is mounted on the carbureter housing 16 so that the stopper 32 can abut against the operation lever 29. The top end of the operation lever 29 is connected to a diaphragm 35 of a diaphragm device 34 through an operation rod 33. The diaphragm device 34 comprises an atmospheric pressure chamber 36 and a vacuum chamber 37, which are separated from each other by the diaphragm 35. The diaphragm 35 is always urged toward the left by the force of a compression spring 38. In FIG. 2, reference numerals 39, 40 and 41 designate an electromagnetic change-over valve, a vacuum operated switch and an electromagnetic change-over valve, respectively. The electromagnetic change-over valve 39 has a valve chamber 42, a vacuum port 43 opened to the valve chamber 42, an atmospheric pressure port 44 opened to the valve chamber 42, a valve body 45 disposed in the valve chamber 42, a movable plunger 46 connected to the valve body 45, a solenoid 47 attracting the movable plunger 46 and a compression spring 48 always pressing the valve body 45 toward the left. The valve chamber 42 is connected to the vacuum chamber 37 of the diaphragm device 34 through a conduit 49. The vacuum port 43 is connected to the interior of the intake manifold 10 located downstream of the throttle valve 13 through a vacuum conduit 50. When the solenoid 47 is energized, the valve body 45 is moved to the right to close the atmospheric pressure port 44 and, as a result, the vacuum chamber 37 is connected to the interior of the intake manifold 10 through conduits 49 and 50. When the solenoid 47 is de-energized, the valve body 45 is returned to the position indicated in FIG. 2 and, as a result, the vacuum chamber 37 is connected to the atmosphere through the atmospheric pressure port 44.

The vacuum operated switch 40 has a vacuum chamber 52 and an atmospheric pressure chamber 53 which are separated from each other by a diaphragm 51. The diaphragm 51 is always pressed to the right by the force of a compression spring 54. The vacuum operated switch 40 further comprises a pair of fixed contacts 55 and 56, which are communicated when brought into contact with the diaphragm 51 as shown in FIG. 2. The vacuum chamber 52 is connected to the interior of the intake manifold 10 located downstream of the throttle valve 13 through the vacuum conduit 50. When the engine is driven by a starter motor at the start of the engine, the vacuum level in the intake manifold 10 is low, and hence, the vacuum level in the vacuum chamber 52 is also low. Accordingly, the diaphragm 51 is located at the position indicated in FIG. 2 and both the fixed contacts 55 and 56 are communicated with each other. When the operation of the engine by its own power is initiated, the vacuum level in the intake manifold 10 is enhanced, and hence, the vacuum level in the vacuum chamber 52 is also enhanced. As a result, the diaphragm 51 is moved to the left against the force of the compression spring 54 and the fixed contacts 55 and 56 are no longer in communication.

The electromagnetic change-over valve 41 comprises a valve chamber 57, a vacuum port 58 opened to the valve chamber 57, an atmospheric pressure port 59 opened to the valve chamber 57, a valve body 60 disposed in the valve chamber 57, a movable plunger 61 connected to the valve body 60, a solenoid 62 attracting the movable plunger 61 and a compression spring 63 always pressing the valve body 60 to the left. The valve chamber 57 is connected to a vacuum advancing diaphragm device 65 of the distributor 15 through a conduit 64. The vacuum port 58 is connected to an advance port 67 through a vacuum conduit 66. When the solenoid 62 is energized, the valve 60 is moved to the right to close an atmospheric pressure port 59 and, as a result, the vacuum advancing diaphragm device 65 is connected to the advance port 67 through conduits 64 and 66. Accordingly, the normal vacuum advancing action is performed. When the solenoid 62 is de-energized, the valve body 60 is returned to the position shown in FIG. 2 and, as a result, the vacuum advancing diaphragm device 65 is connected to the atmosphere through the atmospheric pressure port 59. Accordingly, at this point, since the vacuum advancing action is not performed, the ignition timing is retarded.

The neutral position-detecting switch 6 comprises a pair of movable contacts 68*a* and 68*b* and a pair of fixed contacts 69*a* and 69*b*, which co-operate with each other. As pointed out hereinbefore, when the gear shift of the transmission 5 (see FIG. 1) is in neutral, the switch 6 is in the "off" state, as shown in FIG. 2, and when the gear shift is in the variable speed positions, the switch 6 is in the "on" state. The fixed contacts 69*a* and 69*b* are connected to a power source 71 through an ignition switch 70. The movable contact 68*a* is connected to the solenoid 62 of the electromagnetic change-over valve 41 and the other movable contact 68*b* is connected to the solenoid 47 of the electromagnetic change-over valve 39. The fixed contact 55 of the vacuum operated switch 40 is connected to the power source 71 through the ignition switch 70 and the other fixed contact 56 is connected to the solenoid 62 of the electromagnetic change-over valve 41.

In general, at the start of the engine, the ignition switch 70 is first turned on and, then, the accelerator pedal is depressed to drive the starter motor. During this operation of starting the engine, the gear shift of the transmission 5 is ordinarily set at the neutral position and, hence, the neutral position-detecting switch 6 is in the "off" state, as shown in FIG. 2. Accordingly, even if the ignition switch 70 is turned on, the solenoid 47 of the electromagnetic valve 39 is kept de-energized and, hence, the vacuum chamber 37 of the diaphragm device 34 is in communication with the atmosphere. While the engine is being driven by the starter motor, the vacuum level in the intake manifold is low and, as described hereinbefore, the fixed contacts 55 and 56 of the vacuum operated switch 40 are communicated with each other. Accordingly, the solenoid 62 of the electromagnetic valve 41 is energized to move the valve body 60 to the right and the vacuum advancing diaphragm device 65 of the distributor 15 is connected to the advance port 67. Accordingly, while the engine is being driven by the starter motor, the ignition timing is advanced by the vacuum in the intake manifold. When the operation of the engine by its own power is started, the vacuum level in the intake manifold 10 becomes high and the fixed contacts 55 and 56 of the vacuum operated switch 40 no longer communicate with each other. As a result, the solenoid 62 is de-energized and the valve body 60 is returned to the position indicated in FIG. 2. Accordingly, the vacuum advancing diaphragm device 65 of the distributor 15 is connected to the atmosphere and as a result, vacuum advancing operation is not performed. Thus, the ignition timing is greatly retarded. When the operation of the engine by its own power is initiated, the accelerator pedal is set free. At this point, as shown in FIG. 2, the stepped circumferential cam 17 is stopped at a position abutting against the operation rod 23 and operation lever 29. Accordingly, when the accelerator pedal is set free, the adjustment screw 21 attached to the arm 20 of the throttle valve 13 is turned until it abuts against the cam face l of the stepped circumferential cam 17, and the valve-open state is maintained as shown in FIG. 2. The cam face l is formed so that the degree of opening of the throttle at this point is about 20° to the completely closed position of the throttle valve. The degree of opening set by the conventional fast idling cam mechanism is about 15°. Accordingly, the degree of opening of the throttle valve 13 in the present invention is considerably larger than in the conventional mechanism and, hence, the engine is rotated at a higher speed. Further, since the ignition timing is not advanced in the present invention, the temperature of the exhaust gas is promptly elevated and hence, the catalyzer in the catalytic converter 4 is promptly elevated. When the temperature of the engine-cooling water is then elevated, the detecting portion 24 of the wax valve 22 is heated by this cooling water, and as a result, the operation rod 23 is projected toward the left and the stepped circumferential cam is turned clockwise. Thus, the adjustment screw 21 of the arm 20 of the throttle valve 13 is set free from engagement with the cam face l and is engaged with the cam face m as shown in FIG. 3-(*a*). The cam face m is formed so that at this point the degree of opening of the throttle is about 15°. When the temperature of the engine is then further elevated, the operation rod 23 of the wax valve 22 is further projected, and as a result, the adjustment screw 21 of the arm 20 of the throttle valve 13 is set free from engagement with the cam face m and is engaged with the cam face n as shown in FIG. 3-(*b*). The cam face n is formed so that at this point the degree of opening of the throttle valve is about 13°. When the temperature of the engine is then further elevated, in the same manner as described above, the adjustment screw 21 is set free from engagement with the cam face n and is engaged with the cam face o as shown in FIG. 3-(*c*). The cam face o is formed so that the degree of opening of the throttle valve at this point is about 10°. When the temperature of the engine is further elevated and warm-up is completed, the adjustment screw 21 is set free from engagement with the cam face o and as a result, the throttle valve 13 is returned to the idling position as shown in FIG. 3-(*d*). Since the throttle valve 13 is closed stepwise in the foregoing manner with elevation of the temperature of the engine, excessive enhancement of the number of rotation of the engine is prevented, and therefore, excessive elevation of the exhaust gas temperature and in turn, excessive heating of the catalyzer in the converter 4, are prevented.

Normally, the case where the vehicle is driven during the warm-up operation, during which the throttle valve 13 is kept open as shown in FIG. 2, even if the accelerator pedal is released, the throttle valve 13 is maintained at the throttle opening of about 20°, and therefore, the idling number of rotations is extremely enhanced and the operation becomes dangerous. However, according to the present invention, if the shift lever 7 is shifted to a variable speed position, for example, the low gear position, the neutral position-detecting switch 6 is turned on to energize the solenoid 47 of the electromagnetic change-over valve 39. Thus, the valve body 45 is moved to the right and the vacuum chamber 37 of the diaphragm device 34 is connected to the interior of the intake manifold 10. As a result, the diaphragm 35 is shifted to the right against the force of the compression spring 38 to rotate the operation lever 29 clockwise until it abuts against the stopper 32. Thus, the adjustment screw 21 of the arm 20 of the throttle valve 13 is set free from engagement with the cam face l of the stepped circumferential cam 17 and is engaged with the cam face n as shown in FIG. 3-(*e*). Accordingly, when the accelerator pedal is set free at this point, since the degree of opening of the throttle is maintained at about 13°, the idling number of rotations is not greatly enhanced and the vehicle can be driven with safety. Moreover, when the shift lever 7 is shifted to the variable speed position, the solenoid 62 of the electromagnetic valve 41 is simultaneously energized, and since the vacuum advancing diaphragm device 65 of the distributor 15 is connected to the advance port 67, vacuum advancing control of the ignition timing is performed and the torque necessary for driving the vehicle is generated.

Figure 4:
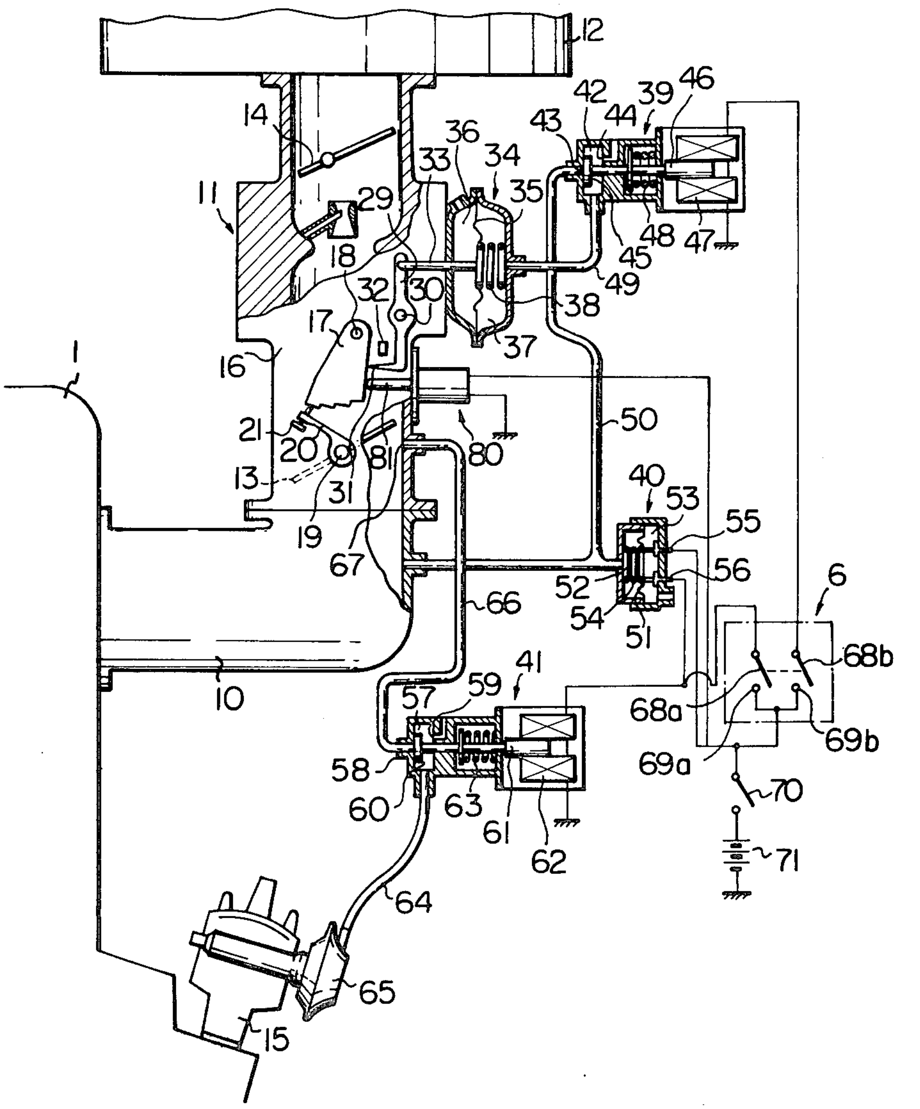
FIG. 4 is a schematic view of another embodiment according to the present invention.

Instead of the wax valve of the cooling water-heating type shown in FIG. 2, in an embodiment shown in FIG. 4 a wax valve of the electric heating type is employed. The wax valve 80 is equipped therein with a positive temperature coefficient thermistor. This thermistor is connected to the power source 71 through the ignition switch 70. Accordingly, when the ignition switch 70 is put on, wax in the wax valve 80 is heated by heat generated by the thermistor, and hence, with the lapse of time, an operation rod 81 is projected to the left and the stepped circumferential cam 17 is turned clockwise. The structural elements and functions of the embodiment shown in FIG. 4 are the same as those of the embodiment shown in FIG. 2, except that the wax valve 80 is electrically heated in the embodiment shown in FIG. 4.

Figure 5:
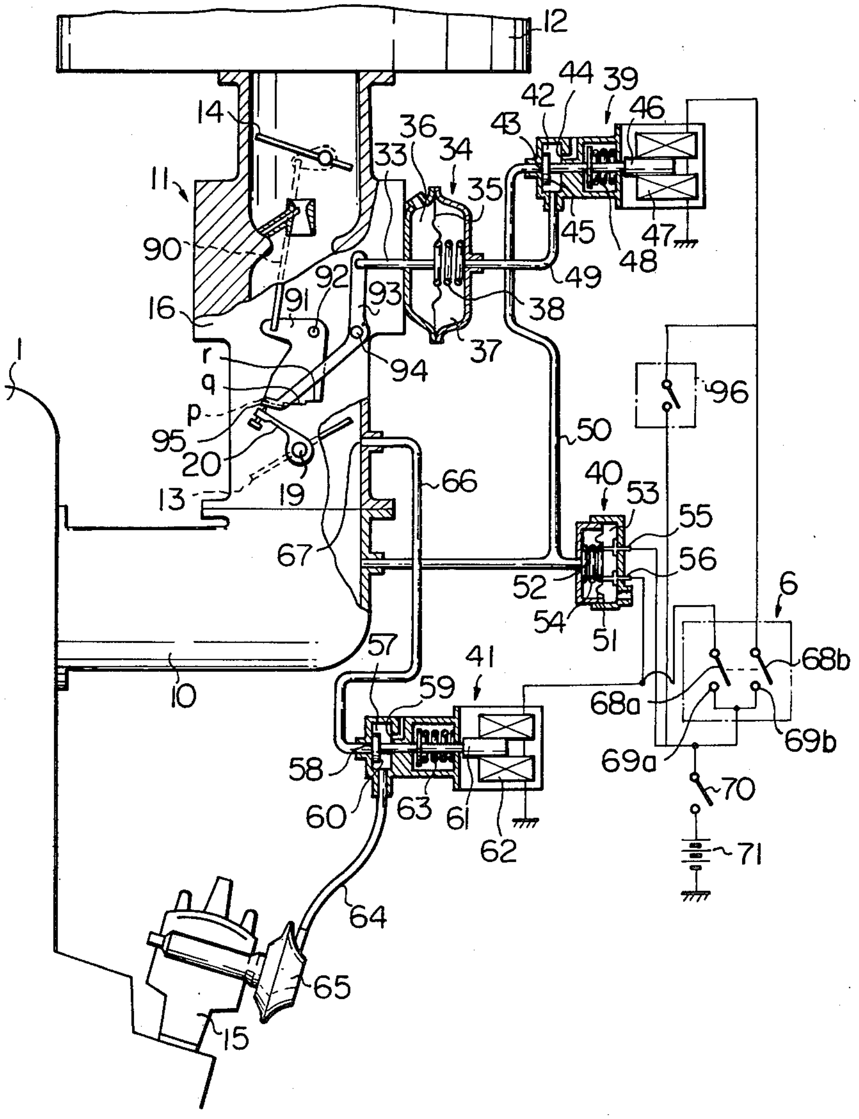
FIG. 5 is a schematic view of a further embodiment according to the present invention.
Figure 6A:
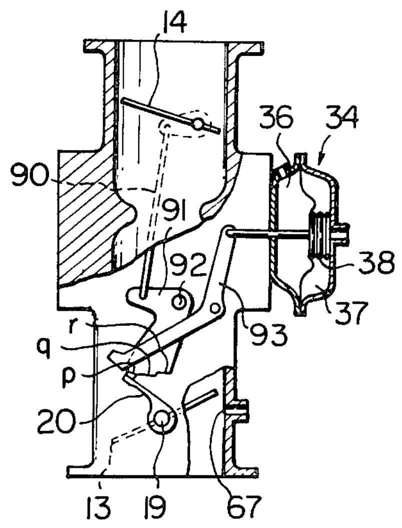
FIG. 6 is a schematic view showing various operating conditions of the purification device shown in FIG. 5.
Figure 6B:
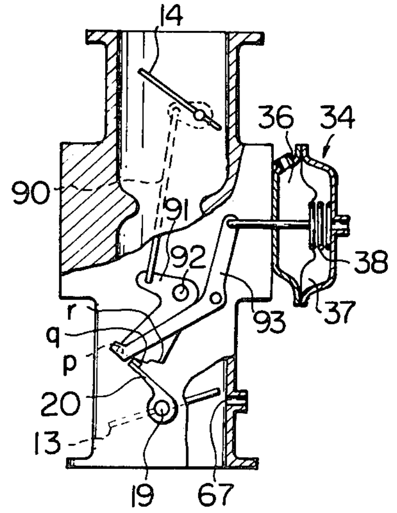
Figure 6C:
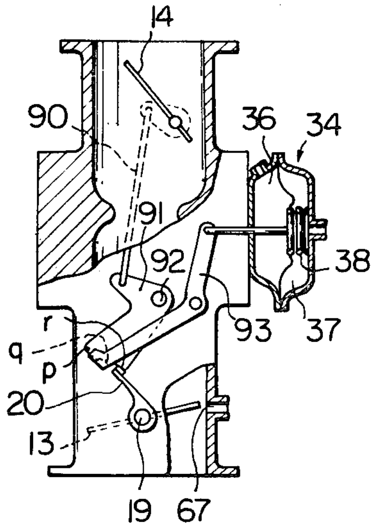
Figure 6D:
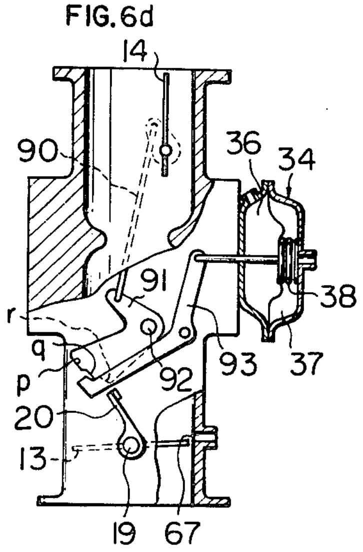

Another embodiment is shown in FIG. 5, in which structural elements the same as those in FIG. 2 are represented by the same referential numerals. Referring to FIG. 5, a conventional fast idle cam mechanism comprises a stepped circumferential cam 91 connected through a rod 90 to the choke valve 14 connected to an automatic choke valve-opening mechanism (not shown) and having three cam faces p, q and r. This stepped circumferential cam 91 is attached to the carbureter housing 16 through a pivot 92. An operation lever 93 is further mounted on the carbureter housing 16 through a pivot 94, and the top end of the operation lever 93 is connected to the operation rod 33 of the diaphragm device 34. As shown in FIG. 5, the operation lever 93 is arranged so that when the vacuum chamber 37 of the diaphragm device 34 is connected to the atmosphere, the lower end 95 of the operation lever 93 is engaged with the top end of the arm 20 of the throttle valve 13 to maintain an opening degree of about 20° in the throttle valve 13. In the embodiment shown in FIG. 5, the solenoid 47 of the electromagnetic change-over valve 39 is connected to the power source 71 through an engine temperature-detecting switch 96 and the ignition switch 70. The engine temperature-detecting switch 96 is arranged so that when the temperature of engine-cooling water is lower than a predetermined level, it is in the "off" state and when the temperature of engine-cooling water reaches the predetermined level, it is turned on. The temperature-detecting switch 96 and the electromagnetic change-over valve 39 may be constructed by a wax type or bimetal type vacuum change-over valve.

FIG. 5 illustrates the state just after initiation of the operation of the engine. At this point, both the neutral position-detecting switch 6 and the engine temperature-detecting switch 96 are in the "off" state, and therefore, the solenoid 47 of the electromagnetic valve 39 is de-energized and the vacuum chamber 37 of the diaphragm device 34 is connected to the atmosphere. Also the solenoid 62 of the electromagnetic change-over valve 41 is de-energized at this point and, hence, the vacuum advancing diaphragm device 65 of the distributor 15 is connected to the atmosphere. Accordingly, at this point, the ignition timing is greatly retarded. When the temperature of the engine is then elevated, the engine temperature-detecting switch 96 is turned on to energize the solenoid 47 of the electromagnetic change-over valve 36. Thus, the valve body 45 is shifted to the right and the vacuum is produced in the vacuum chamber 37 of the diaphragm device 34. Accordingly, the diaphragm 35 is moved to the right against the force of the compression valve 38 to turn the operation lever 93 clockwise. As a result, the arm 20 of the throttle valve 13 is set free from the operation lever 93 and is engaged with the cam face p of the stepped circumferential cam 91 as shown in FIG. 6-(*a*). At this point, the degree of opening of the throttle is about 15°. When the engine temperature is then further elevated, the choke valve 14 is automatically opened to turn the stepped circumferential cam 91 clockwise. As a result, the arm 20 of the throttle valve 13 is set free from engagement with the cam face p and falls into engagement with the cam face q as shown in FIG. 6-(*b*). At this point, the degree of opening of the throttle is about 13°. When the engine temperature is then further elevated, the choke valve 14 is further opened and, as a result, the arm 20 of the throttle valve 13 is set free from engagement with the cam face q and is engaged with the cam face r as shown in FIG. 6-(*c*). When the engine temperature is then further elevated, the choke valve is completely opened and warm-up is completed. At this point, the arm 20 of the throttle valve 13 is released from engagement with the cam face r and the throttle valve 13 is returned to the idling position as shown in FIG. 6-(*d*).

In the case where the vehicle is driven during the warm-up operation at which the throttle valve 13 is kept open as shown in FIG. 5, since the neutral position-detecting switch 6 is turned on, the solenoid 47 of the electromagnetic change-over valve 39 is energized and, as a result, the vacuum in the intake manifold is produced in the vacuum chamber 37 of the diaphragm device 34. As a result, the operation lever 93 is turned clockwise, and the arm 20 of the throttle valve 13 is disengaged from the operation lever 93 and is engaged with the cam face p of the stepped circumferential cam 91 as shown in FIG. 6-(*a*). Accordingly, the degree of opening of the throttle is reduced to about 15° from about 20°. When the neutral position-detecting switch 6 is turned on, the solenoid 62 of the electromagnetic change-over valve 41 is energized to connect the vacuum advancing diaphragm device 65 of the distributor 15 to the advance port 67, whereby the vacuum advancing operation is performed.

As will be apparent from the foregoing illustration, according to the present invention, by setting the degree of throttle opening after the start of the engine at a level larger than the throttle opening degree set by the conventional fast idle cam mechanism, it is possible to heat the catalyzer or thermal reactor promptly. As a result, the efficiency of purifying exhaust gases can be enhanced and the amount of poisonous components discharged during the warm-up operation can be reduced. Further, since the degree of throttle opening is lowered with the rising of the engine temperature, it is possible to prevent the catalyzer or thermal reactor from being exposed to high-temperature exhaust gases over a long period of time and, consequently, thermal degradation of the catalyzer or thermal reactor can be prevented. Still further, since the ignition timing is greatly retarded during the warm-up operation, the exhaust gas temperature is elevated during the warm-up operation, and therefore, the catalyzer or thermal reactor can be promptly heated after the start of the engine. Still further, even if the vehicle is driven just after initiation of the warm-up operation, since the idling opening degree of the throttle valve is reduced, the vehicle can be driven with safety.

While the invention has been described by reference to specific embodiments chosen for purposes of illustration, it should be apparent that numerous modifications could be made thereto by those skilled in the art without departing from the spirit and scope of the invention.

What is claimed is:

1. An exhaust gas purification promoting device of an internal combustion engine having a starting means, a carburetor with a throttle valve in its intake passage, a distributor having a vacuum advance mechanism, an exhaust gas purifier in its exhaust system and a transmission with a shift gear, said device comprising:
   - means for temporarily maintaining the throttle valve at a predetermined first opening degree when the temperature of the engine is lower than a predetermined first level;
   - means for detecting the gear position of the gear shift to provide a signal indicating that the gear shift is shifted from neutral into a gear;
   - means for actuating said maintaining means to release the holding operation of the throttle valve and return the throttle valve to a second opening degree, which is smaller than said first opening degree, in response to said signal when the gear shift is shifted from neutral;
   - a vacuum operated switch for producing a first operating signal indicating that the engine is being rotated by the starting means and a second operating signal indicating that the engine is operating by its own power;
   - a vacuum control valve for controlling the vacuum level in the vacuum advance mechanism for advancing the ignition timing in response to the first operating signal from said switch during the time the engine is being rotated by the starting means, for retarding the ignition timing in response to the second operating signal from said switch during the time the engine is warming up and the gear shift is in neutral, and for advancing the ignition timing in response to the signal from the detecting means when the gear shift is shifted into gear and the engine is warming up.

2. An exhaust gas purification promoting device as claimed in claim 1, wherein said maintaining means comprises cam means engageable with the throttle valve for temporarily maintaining the throttle valve at said first opening degree when the temperature of the engine is lower than said first level and for returning the throttle valve to its idling position when the temperature of the engine becomes higher than a predetermined second level which is higher than said first level, and a cam actuating member co-operating with said cam means and actuated by said actuating means for closing the throttle valve to said second opening degree from said first opening degree when the gear shift is shifted from neutral.

3. An exhaust gas purification promoting device as claimed in claim 2, wherein said cam means comprises a stepped circumferential cam having a plurality of cam faces engageable with the throttle valve, and a cam actuating apparatus co-operating with said stepped circumferential cam for the stepwise returning of the throttle valve to its idling position from said first opening degree in response to an increase in temperature of the engine.

4. An exhaust gas purification promoting device as claimed in claim 3, wherein said cam actuating apparatus comprises a wax valve having a operation rod engageable with said stepped circumferential cam, said operation rod gradually projecting in accordance with the increase in temperature of the engine.

5. An exhaust gas purification promoting device as claimed in claim 4, wherein said wax valve has a detecting portion dipped in coolant of the engine.

6. An exhaust gas purification promoting device as claimed in claim 4, wherein said wax valve has a positive temperature coefficient thermister therein.

7. An exhaust gas purification promoting device as claimed in claim 1, wherein said actuating means comprises a vacuum controlled device for actuating said maintaining means, and a vacuum control valve for controlling the vacuum level in said vacuum controlled device in response to said signal derived from said detecting means.

8. An exhaust gas purification promoting device as claimed in claim 7, wherein said vacuum controlled device comprises a diaphragm apparatus having a vacuum chamber which is connected to the intake passage located downstream of the throttle valve via said vacuum control valve.

9. An exhaust gas purification promoting device as claimed in claim 7, wherein said vacuum control valve comprises an electromagnetic valve disposed in a vacuum passage communicating said vacuum controlled valve with the intake passage located downstream of the throttle valve for normally connecting the vacuum controlled device to the atmosphere and for connecting the vacuum controlled device to the intake passage when the gear shift is shifted from neutral.

10. An exhaust gas purification promoting device as claimed in claim 1, wherein said engine further comprises an automatic choke mechanism and a fast idle cam mechanism co-operative therewith, said maintaining means comprising an opening degree setting member engageable with the throttle valve for temporarily maintaining the throttle valve at said first opening degree when the temperature of the engine is lower than said first level and for closing the throttle valve from said first opening degree to said second opening degree set by said fast idle cam mechanism when the temperature of the engine becomes higher than said first level or when the shift gear is shifted from the neutral position.

11. An exhaust gas purification promoting device as claimed in claim 10, wherein said actuating means comprises a vacuum controlled device for actuating said maintaining means, and a vacuum control valve for controlling the vacuum level in said vacuum controlled device in response to said signal derived from said detecting means and in response to the change in temperature of the engine.

12. An exhaust gas purification promoting device as claimed in claim 11, wherein said vacuum controlled device comprises a diaphragm apparatus having a vacuum chamber which is connected to the intake passage located downstream of the throttle valve via said vacuum control valve.

13. An exhaust gas purification promoting device as claimed in claim 11, wherein said vacuum control valve comprises an electromagnetic valve disposed in a vacuum passage communicating said vacuum controlled valve and the intake passage located downstream of the throttle valve for normally connecting the vacuum controlled device to the atmosphere and for connecting the vacuum controlled device to the intake passage when the gear shift is shifted from neutral or when the temperature of the engine becomes higher than said first level.

14. An exhaust gas purification promoting device as claimed in claim 13, wherein said electromagnetic valve is connected to a power source via said detecting means and an engine-temperature detecting switch which are arranged in parallel.

15. An exhaust gas purification promoting device as claimed in claim 1, wherein said vacuum control valve controls the vacuum level in the vacuum advance mechanism for retarding the ignition timing in response to said second operating signal from said switch and in response to said signal from said detecting means when the engine is rotating by its own power and when the gear shift is in neutral.

16. An exhaust gas purification promoting device as claimed in claim 15, wherein said switch comprises a diaphragm, a vacuum chamber connected to the intake passage located downstream of the throttle valve, and a pair of stationary contacts co-operating with said diaphragm and interconnected to each other when the vacuum level in said vacuum chamber is smaller than a predetermined level.

17. An exhaust gas purification promoting device as claimed in claim 15, wherein said vacuum control valve comprises an electromagnetic valve disposed in a vacuum conduit communicating said vacuum advance mechanism with the intake passage located downstream of the throttle valve for normally connecting the vacuum advance mechanism to the intake passage and for connecting the vacuum advance mechanism to the atmosphere when the engine is rotating by its own power and when the gear shift is in neutral.

18. An exhaust gas purification promoting device as claimed in claim 17, wherein said electromagnetic valve is connected to a power source via said switch and said detecting means which are arranged in parallel.

19. An exhaust gas purification promoting device as claimed in claim 1, wherein said first opening degree of the throttle valve is about 20 degrees to the completely closed position of the throttle valve.

20. An exhaust gas purification promoting device as claimed in claim 1, in which, when the gear shift is in gear and the engine is warming up, the degree of opening of the throttle valve is automatically reduced to an extent which is greater than the idling opening degree.

* * * * *